United States Patent
Bob et al.

(10) Patent No.: US 12,184,670 B2
(45) Date of Patent: Dec. 31, 2024

(54) DYNAMIC COMPUTER THREAT ALERT SYSTEM AND METHOD

(71) Applicant: Alert Logic, Inc., Houston, TX (US)

(72) Inventors: Evgeny Bob, Houston, TX (US); Paul Fisher, Houston, TX (US); Hugues Martel, Houston, TX (US)

(73) Assignee: ALERT LOGIC, INC., Houston, TX (US)

( * ) Notice: Subject to any disclaimer, the term of this patent is extended or adjusted under 35 U.S.C. 154(b) by 143 days.

(21) Appl. No.: 17/590,219

(22) Filed: Feb. 1, 2022

(65) Prior Publication Data

US 2022/0247763 A1     Aug. 4, 2022

Related U.S. Application Data

(60) Provisional application No. 63/144,087, filed on Feb. 1, 2021.

(51) Int. Cl.
*H04L 9/40* (2022.01)
*H04L 45/42* (2022.01)
*H04L 67/1097* (2022.01)

(52) U.S. Cl.
CPC ......... *H04L 63/1416* (2013.01); *H04L 45/42* (2013.01); *H04L 63/1425* (2013.01); *H04L 63/145* (2013.01); *H04L 63/1466* (2013.01); *H04L 63/20* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 11,451,565 B2* | 9/2022 | Zhou | G06N 3/084 |
| 11,687,438 B1* | 6/2023 | Torbett | G06F 11/3428 |
| | | | 702/186 |
| 11,777,970 B1* | 10/2023 | Wainer | G06F 16/24578 |
| | | | 726/23 |

FOREIGN PATENT DOCUMENTS

| | | | | |
|---|---|---|---|---|
| EP | 3742700 A1 * | 11/2020 | | G06N 20/00 |
| WO | WO-2017074732 A1 * | 5/2017 | | G06F 21/50 |

OTHER PUBLICATIONS

Nagrashree, N. et al. "An Early Risk Detection and Management System for the Cloud with Log Parser". Computers in Industry 97 (2018). pp. 24-33. Elsevier. (Year: 2018).*

* cited by examiner

*Primary Examiner* — Jeffrey R Swearingen
(74) *Attorney, Agent, or Firm* — Fredrikson & Byron, P.A.

(57) ABSTRACT

A configurable system and method for automatically taking in streams of log data from various sources, dynamically parsing, normalizing the data and routing it to subsystems of an analytics engine. The routed data may undergo aggregating and other enrichment based on content, rules and data, so as to generate useful event observations, which may recursively be fed back into the system's data ingestion stream to further enhance the usefulness of the system's outputs, in real-time, in the context of computer system and data security.

7 Claims, 5 Drawing Sheets

DYNAMIC COMPUTER THREAT ALERT SYSTEM AND METHOD

RELATED APPLICATIONS

This application claims the benefit of and priority to U.S. Provisional Application No. 63/144,087, filed on Feb. 1, 2021, which is hereby incorporated by reference.

TECHNICAL FIELD

The present application generally relates to machine detection and response to threats to computing systems, data and environments.

BACKGROUND

Modern hyperscaling virtualized remote environments (collectively, the public cloud) provide the capability to generate, transmit, and store, unprecedented volumes of data. Traditional security monitoring and analysis approaches rely on the ingestion and analysis of a variety of data types collected from the systems under management. These traditional approaches cannot process the volumes of data created in these new environments and have no means to identify and disrupt attacks in a timely manner because of the analytic latency incurred. Attackers, particularly those that employ automated multi-component techniques to infect and spread laterally across these infrastructures, are difficult or impossible to block, and the damages that result increase exponentially during the time they continue to operate undiscovered.

Generally, the present disclosure is concerned with managing and processing data, specifically data related to event logging of certain events or actions in a computing system or network. Present systems and methods for managing computer log data streams are part of and interact with environments that collect data (e.g., customer data), archive data, store data, search data, enrich data and sometimes merge data with metadata tags as will be discussed further. Those skilled in the art will understand that logging and managing log data in such systems can scale to very large amounts of information and require large computing resources for storing and processing said data. It can be challenging, even using modern computing systems to adequately and effectively carry out such tasks where the number and size of the incoming log data (data input pipes) are substantial.

Prior methods statically parse streams of data and require indexing and hence storing of massive amounts of data in large commercial systems, which is both resource intensive and inefficient. Prior methods also lack the ability to effectively adapt to changing conditions within the computing environment managing such processes.

The present system and method overcome these and other limitations of prior systems and methods.

SUMMARY

The present invention can be implemented in a variety of ways according to the specific need at hand. In one or more instances, the invention can comprise or be used in or with a security as a service platform, and more particularly, as a part of a correlation and analytics subsystem, such as in a logic analytics engine thereof. Those skilled in the art will appreciate that such implementations can vary from one implementation to another, from one customer to another, and from time to time as the myriad platforms and environments are developed and evolve within a larger data and computing universe.

Aspects of the present disclosure and invention provide real-time processing of user, customer and/or third-party information to detect malicious or unwanted activity within a computing or data environment. Because the nature of potential threats to the computing environments is dynamic and generally unpredictable, the detection and initiation of action in response to a threat are preferably also dynamic and able to be renewed or updated in time to keep pace with such threats. The present analytics engine, which is implemented as discussed more fully below, is configured and arranged as a computing infrastructure upon which the present detection and response capabilities are developed and carried out.

One aspect of the invention includes an information gathering and normalization system that is capable of communicating with a wide variety of collection sources and can ingest the volumes of information produced by these hyperscaling systems. Real-time or near real-time analytics, however, require efficient identification and processing of only a small subset of this data, based on attack indicators derived from research. As a result, another aspect of the invention includes a means of limiting the specific data elements that will be extracted from the streaming data ingestion, providing a tractable and useful set of data against which to automatically perform specialized, stateful and independently developed analytical routines. The present system embodies the ability to process thousands of such specialized analytical routines independently, across tens of thousands of customers, representing many millions of messages per second. In the course of the identification and evaluation of an attack, additional and orthogonal data may also be required, and as a result, another aspect of the invention includes the ability, in real time, to reconfigure, or elaborate the data elements or fields that are being extracted from the ongoing data ingestion stream.

One or more embodiments are directed to a method carried out in a cloud-based data center, the method being for dynamic processing of computer log data using an analytics engine system, the method as a service comprising in an ingestor sub-system, receiving one or more streams of log data from one or more sources of log data; in a filter-router sub-system, pre-filtering said streams, identifying sources of received data, and extracting selected data for routing to one or more destinations within said analytics engine; dynamically parsing, in real-time, some or all of said log data in said analytics engine, according to a plurality of programmed parsing rules, and based on said parsing, identifying respective characteristics of portions of said log data; dynamically extracting meaningful information tokens from parsed data, in real-time during said parsing, to generate action outputs based on said extracted meaningful tokens; normalizing data in said streams so as to remove syntactical variants therefrom and generate normalized data; enriching the normalized data so as to generating enriched data by populating additional meaningful data properties onto said normalized data; in an aggregator sub-system to aggregate a plurality of said enriched data, in real-time using a plurality of programmed aggregation rules; generating a plurality of observations, in real-time, using a plurality of programmed triggers; and sending said observations back to said ingestor so as to identify an incident representing a security threat to the sources of log data.

One or more embodiments are directed to a cloud-based data center system capable of identifying and responding to threats to a computing environment, the system comprising an analytics engine comprising a plurality of subsystems corresponding to respective processor-based circuits or circuit portions and respective corresponding machine-readable program instructions residing in non-volatile memory within or coupled to said analytics engine; at least one data input channel carrying digitized information or data streams from a plurality of data sources including external data sources from outside the system and internal data sources from within the analytics engine; a data ingestor subsystem of said analytics engine, coupled to said at least one data input channels, receiving input data therefrom, and corresponding to an ingestor portion of said circuitry and respective machine-readable program instructions, the ingestor subsystem configured and arranged to organize and direct ingested data from the one or more data input channels to other subsystems within said analytics engine; a router subsystem of said analytics engine, coupled to an output of said ingestor, and corresponding to at least a router portion of said circuitry and respective machine-readable program instructions, the router subsystem configured and arranged to organize and direct routed data to other subsystems of the analytics engine, based on defined content comprising routing rules, coupled to and received by said analytics engine; a real-time aggregator subsystem of said analytics engine, coupled to and receiving at least some of said routed data, and corresponding to at least an aggregator portion of said circuitry and respective machine-readable program instructions, the aggregator subsystem configured and arranged to aggregate or accumulate a plurality of events encoded in said routed data and to output aggregate data to at least some other subsystems of the analytics engine including said ingestor subsystem; a correlation trigger subsystem of said analytics engine, coupled to and receiving at least said routed data from the router subsystem, the correlation trigger subsystem configured and arranged to identify and generate observations based at least on said routed data received by the correlation trigger subsystem and based on defined content comprising trigger rules that act as observation generation rules or expressions; and at least one real-time feedback data path within said analytics engine, connecting an output of at least one of said aggregator, router or trigger subsystems to an input of said ingestor subsystem so as to form a recursive loop.

BRIEF DESCRIPTION OF THE DRAWINGS

For a fuller understanding of the nature and advantages of the present concepts, reference is made to the following detailed description of preferred embodiments and in connection with the accompanying drawings.

DETAILED DESCRIPTION

Figure 1:
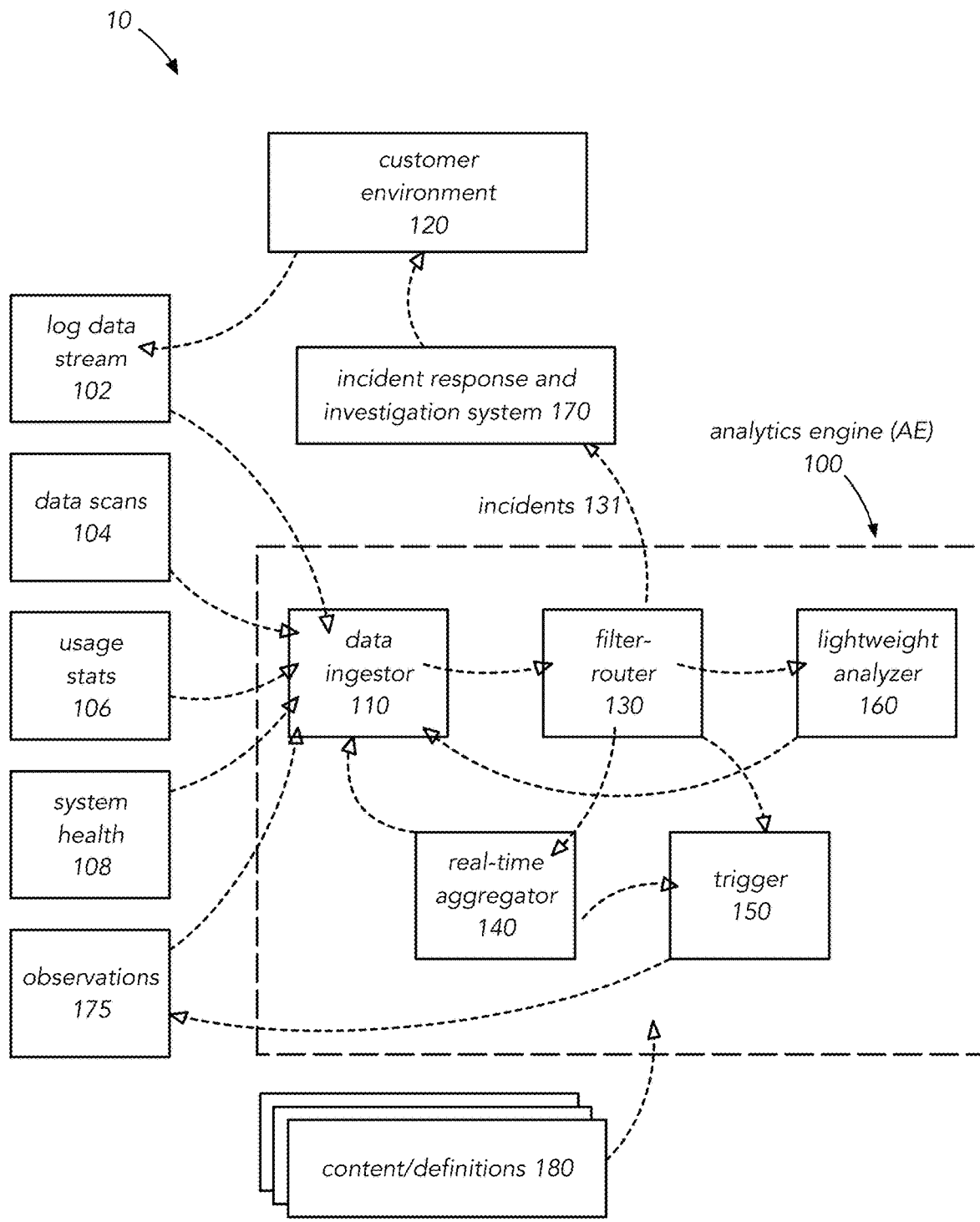
FIG. 1 illustrates a high-level system and method of the invention, and some key subsystems and features according to one or more embodiments.

FIG. 1 conceptually illustrates a generalized arrangement of a system for detecting and responding to threats to a computer and data environment 10 comprising an analytics engine (AE) 100, which can be used in one or more embodiments of the invention. The figure depicts data such as customer log data arriving in one or more streams 102 from respective customers or protected computing environments 120 into the present system (and method). The subsystem that accomplishes the intake or ingestion of the incoming log data is sometimes referred to as a data ingestor subsystem 110, which carries out some other storage and data access tasks as well. Principally, the data ingestor 110 receives and streams some or all of the received customer log data 102 in real-time for routing and processing. The data ingestor 110 thus permits taking in (or ingesting) data of virtually any data type that those skilled in the art can conceive of supporting and producing. For example, data scans 104, usage statistics 106, computer system health 108 and observations 175 of the present system (described herein) are capable of being delivered to ingestor 110. Ultimately, the present system 10 and method are capable of detecting and assessing anomalies and threats to computer or data environments, including generating observations 175 and incidents 131, which can be referred to or escalated to human or machine agents or customers for further action and response.

In an aspect, the present invention 10 includes an analytics engine 100 as described and may be built upon other computing architectures such as an Insight Web Services (IWS) infrastructure and/or deployed using internet server infrastructure such as the Amazon Web Services (AWS) or other services.

The analytics engine 100 realizes some of its functionality using a number of novel subsystem components and methods as described herein. FIG. 1 further shows such subsystems including a filter router 130, a real-time aggregator 140 (RTA) and a correlation trigger (or just trigger) 150 and how these are integrated with data flows to and from the ingestor subsystem 110. The figure also shows an exemplary and non-limiting configuration where the correlation trigger subsystem 150 receives output from the filter router subsystem 130, though it can also receive input data from the real-time aggregator 140.

The filter router 130 processes received data from the ingestor 110, selects data records needed by or relevant to the operation of the other analytics engine subsystems such as the correlation trigger subsystem 150, and sends output data to the subsystems of the analytics engine 100 as appropriate. In an aspect, the analytics engine subsystems register with filter router 130 with a filter expression and a project identifier that inform the filter router what data records need to be sent and processed by the other subsystems (e.g., the correlation trigger subsystem 150). A project identifier acts to aid the selection of a subset of data properties from the incoming data volume and projects or propagates this selection into a data output corresponding thereto.

The analytics engine 100 of the present invention 10 may be configured to interact with other parts of the system using a data flows through the ingestor 110. The analytics engine provides a configurable transformation of customer data 102 into observations that are funneled back using the ingestor 110 for distribution to the other parts of the present system and method.

We can refer to an analytic as a custom program or set of machine-executable, machine-readable and/or machine-interpreted instructions, which can be written by a content developer and/or engineer to accomplish an arbitrary computation over a portion of the data streams that ultimately generate an observation.

In an aspect, the analytics engine 100 achieves said configurable transformation of customer data 102 and derived information by introducing content artifacts with analytics modules into the system under the control of a content developer. As more new observations are generated, they are fed back into the present system and method and are correlated by correlators within the analytics engine to generate outputs representative of security incidents. The security incidents can then be directed to and investigated by a security operations center (SOC) analyst.

The analytics engine 100 may be further configured and programmed to be open from the perspective of implementation language and/or technologies in some embodiments. However, in a preferred embodiment it is structured to allow a constellation of analytics to be controlled and tuned for a given customer of the system and method. In some examples, a given customer may have access to the system and method to perform its own tuning to suit its purposes, while in other examples a service provider or administrator of the system and method performs these tasks for the customer. In yet other examples both a customer staff as well as service provider staff have respective responsibilities in tuning and maintaining the operation of the system and method for the customer.

Reference is made herein to an analyzer or lightweight analytics subsystem 160, which in some embodiments provide a platform for implementing analytic features as simple Lambda functions. This may provide a simplified interface for processing data records using a large variety of programming languages and relatively minor requirements for infrastructure cost or management. These functions can run directly on a platform such as AWS Lambda in some non-limiting examples, or similar platforms that can be managed as a service. However, those skilled in the art will appreciate that other implementations are possible, including on cloud-based service provider platforms or local client platforms and servers.

Where the analytics engine 100 requires large amounts of computing resources a computational analytics module may be employed and programmed and configured on, e.g., a Spark or Hadoop or similar platform. In an aspect, this may allow a substantially amount of computing (e.g., CPU) resources relative to the volume of data being processed.

It should be emphasized that the present examples are provided for the sake of illustration, and not by way of limitation. Those skilled in the art will appreciate that the various subsystems, modules, engines or components of the system 10 are not always constrained to be arranged and configured as suggested by a present example or drawing. Specifically, those skilled in the art may implement this invention with some functions or components stated to be part of the analytics engine 100 being separately implemented, in real space or logical space. In other words, the dashed line 100 of FIG. 1 is a suggestion of one or more embodiments comprehended herein, but other examples are also possible where some parts of the system (for example ingestor 110) may be defined as separate systems or sub-systems as well. Also, many sub-components and modules can be further defined within each general subsystem described herein, and for the sake of brevity and clarity this disclosure does not always indicate every dependent functionality or routine or module that can be part of the modules and subsystems described.

An incident response and investigation system (sometimes referred to as IRIS) 170 may be defined and may automatically process security incidents 131, and optionally some or all of said observations 175, and can elaborate each such incident or observation if and as programmed. Observations made using this system and method are enriched by one or more aggregate and/or filter and projection specifications, which represent additional context that is likely to be relevant in verification or investigation by a SOC analyst or customer.

The real-time aggregator (RTA) 140 performs data aggregation substantially in real-time as follows. This subsystem 140 receives data (e.g., from filter router 130) and processes the data to generate streaming aggregate outputs based on a set of programmed rules. These aggregation rules comprise at least: a filter expression, projection, and aggregation operations. The RTA 140 is optionally represented by a service providing the ability to declare, update and delete the aggregation rules, as well as to provide access to the aggregation data generated by the aggregation operations or rules dynamically and in real-time. The output of the RTA 140 can be considered a telemetry stream of data that may be sent to other components of the system 10 such as back to ingestor 110.

The correlation trigger(s) 150 are one or more modules or subsystems of the system 10 and analytics engine 100 that is programmed, configured and arranged to process a set of rules which are filter expressions as described herein, projection(s), and an observation generation template. In an aspect, the observation generation template is a content artifact, which aids the system to annotate newly generated observations. The template may assign a human-readable name or description to a newly generated observation and/or add useful meta data thereto such as a summary or a set of recommended actions.

The correlation trigger(s) 150 first process then register each filter expression with the filter router 130 described above to cause the required subset of data records to the correlation trigger 150. Trigger rules are processed and filter expressions are extracted and loaded into the filter router subsystem 130 and allow it to return a portion of the data to trigger 150 and/or the generation of trigger rules. The correlation trigger 150 then processes said records to determine if a specific potential observation should be generated and output as observations 175. This is a declarative way to generate said observations 175 that in some aspects does not require the deployment of a full analytic procedure at this part of the system 10.

Returning to the overall discussion of the present analytics engine 100, in some aspects the analytics engine is programmed, configured and arranged to process three types of results or data: facts, observations 175 and incidents 131. Facts as the term is used herein comprise raw data records usually collected directly from a customer's data environment. Facts can be relatively high-volume data types typically handled by specialized processing components in the analytics system, which are thus managed by parts of the system that are configured and adapted for processing arbitrary data forms, types and scales.

Observations 175 as the term is used herein comprise information data types that are produced by some analytic subsystem or engine and are usually obtained by processing a plurality (e.g., large amount) of facts. Observations may or may not be significant from a security perspective. Observations are combined in some embodiments with other observations to deduce or determine or detect patterns or sequences that are significant from a security perspective.

Observations can be, but are not necessarily, generated by respective different analytics in the analytics engine, and may use one of several different implementation languages or technology platforms.

Incidents 131 as used herein are observations that have been determined to be significant from a security perspective and that may be worth escalating or flagging to a customer 120 or IT or security system, personnel or department. So, observations 175 are generated by analytics from data received from the ingestor 110, and the observations are in an aspect directed back to the ingestor 110. This re-cycling or iterative or recursive processing of observations provides the current system 10 and method with a dynamic and rich nature that can effectively increase the effectiveness of the observation and incident generation functionality. Therefore, in some aspects, observations 175 may be generated by one or more observations as parents which contributed to the analysis that produced each instance of the observation. In this way, observations from an acyclic graph, the leaves of which comprise the raw data records that lead to the graph.

Examples of observations 175 could be repeated failed login attempts, a successful login following failed login attempts, a successful escalation of user privileges in a computing environment and other potentially relevant observations of activity in said environment as well as patterns and correlations of the same. An incident comprises an explicit conclusion by an active component of the analytics engine of a security issue in a customer computing or data environment. Incidents 131 are typically validated and investigated by a SOC analyst, and if deemed significant, escalated to the customer 120 or an agent of the customer. An incident 131 can have similar relationships within the present system and method as an observation 175.

Incidents 131 may be passed to such staff (e.g., customer) directly, or may be first investigated by a security operations center (SOC) analyst. The SOC analyst (which may be a human or machine) will examine the correlated raw data records and determine if and what actual impact or risk exists to a customer's environment and may take action or escalate the incident further as needed.

We thus disclose a novel and useful cloud-based data center system capable of identifying and responding to threats to a computing environment, the system comprising an analytics engine comprising a plurality of subsystems corresponding to respective processor-based circuits or circuit portions and respective corresponding machine-readable program instructions residing in non-volatile memory within or coupled to said analytics engine; at least one data input channel carrying digitized information or data streams from a plurality of data sources including external data sources from outside the system and internal data sources from within the analytics engine; a data ingestor subsystem of said analytics engine, coupled to said at least one data input channels, receiving input data therefrom, and corresponding to an ingestor portion of said circuitry and respective machine-readable program instructions, the ingestor subsystem configured and arranged to organize and direct ingested data from the one or more data input channels to other subsystems within said analytics engine; a router subsystem of said analytics engine, coupled to an output of said ingestor, and corresponding to at least a router portion of said circuitry and respective machine-readable program instructions, the router subsystem configured and arranged to organize and direct routed data to other subsystems of the analytics engine, based on defined content comprising routing rules, coupled to and received by said analytics engine; a real-time aggregator subsystem of said analytics engine, coupled to and receiving at least some of said routed data, and corresponding to at least an aggregator portion of said circuitry and respective machine-readable program instructions, the aggregator subsystem configured and arranged to aggregate or accumulate a plurality of events encoded in said routed data and to output aggregate data to at least some other subsystems of the analytics engine including said ingestor subsystem; a correlation trigger subsystem of said analytics engine, coupled to and receiving at least said routed data from the router subsystem, the correlation trigger subsystem configured and arranged to identify and generate observations based at least on said routed data received by the correlation trigger subsystem and based on defined content comprising trigger rules; and at least one real-time feedback data path within said analytics engine, connecting an output of at least one of said aggregator, router or trigger subsystems to an input of said ingestor subsystem so as to form a recursive loop.

Figure 2:
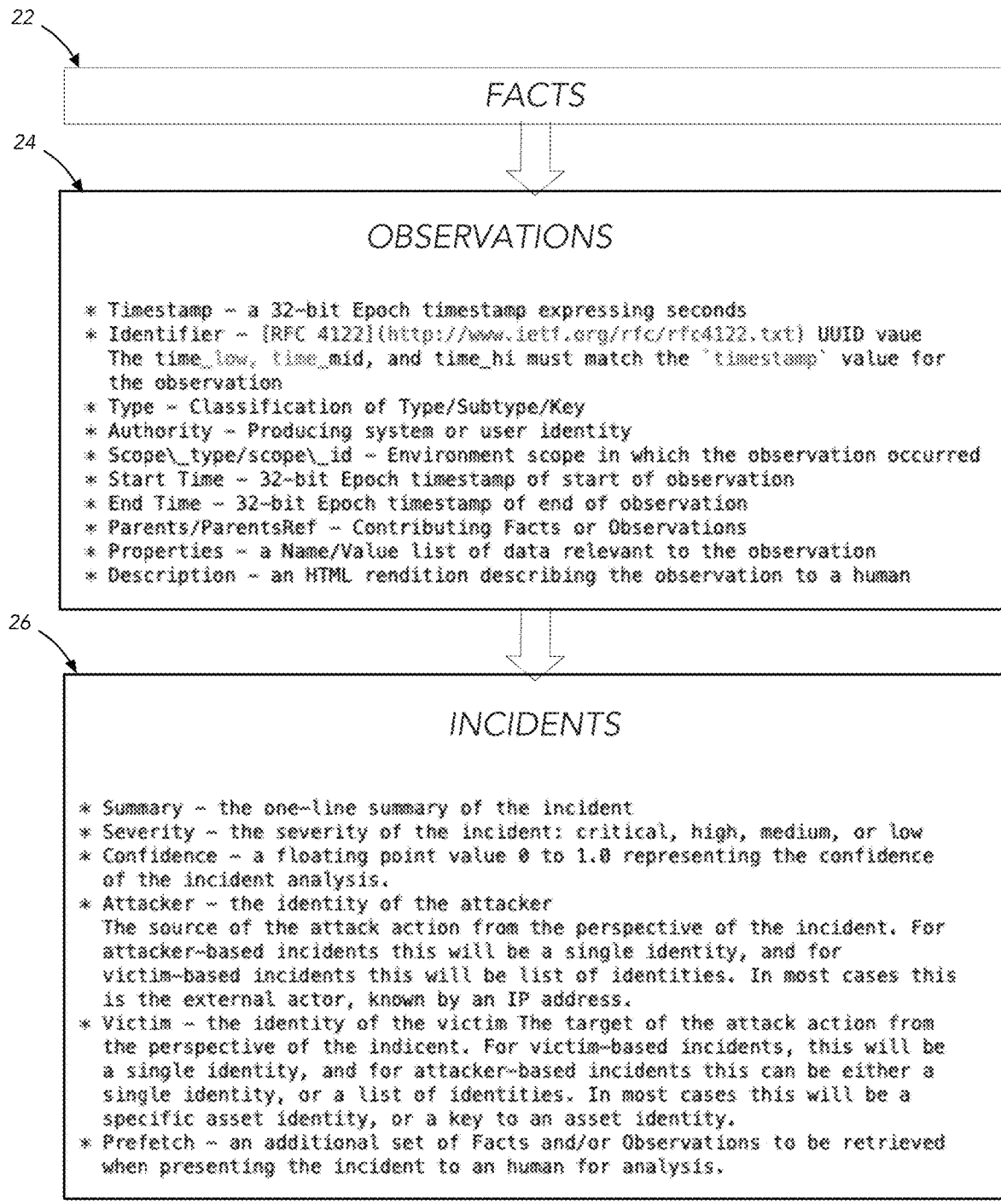
FIG. 2 illustrates an exemplary conceptual description of facts, observations and incidents in the present context according to one or more embodiments.

FIG. 2 illustrates the relation between facts 22, which can be one or more streams of incoming ingested customer log data, observations 24 and incidents 26 in a non-limiting exemplary aspect of the present system and method. Those skilled in the art will understand that these embodiments can be varied and implemented in other ways that are equivalent and equally comprehended within the scope of this disclosure and invention. Note that an observation 24 can comprise data indicative or encoding a timestamp, a type or classification, and other data related to the observation. Also, note that an incident 26 can comprise data indicative of or encoding a summary, a severity of the incident (e.g., classification of low, medium, high or critical severity), an identity or type of attacker/cause for incident, an identity or type of victim of an attack or incident, and other indications or signals including in an example some pre-fetch data containing facts and/or observations 24 relevant to an incident 26.

Figure 3:
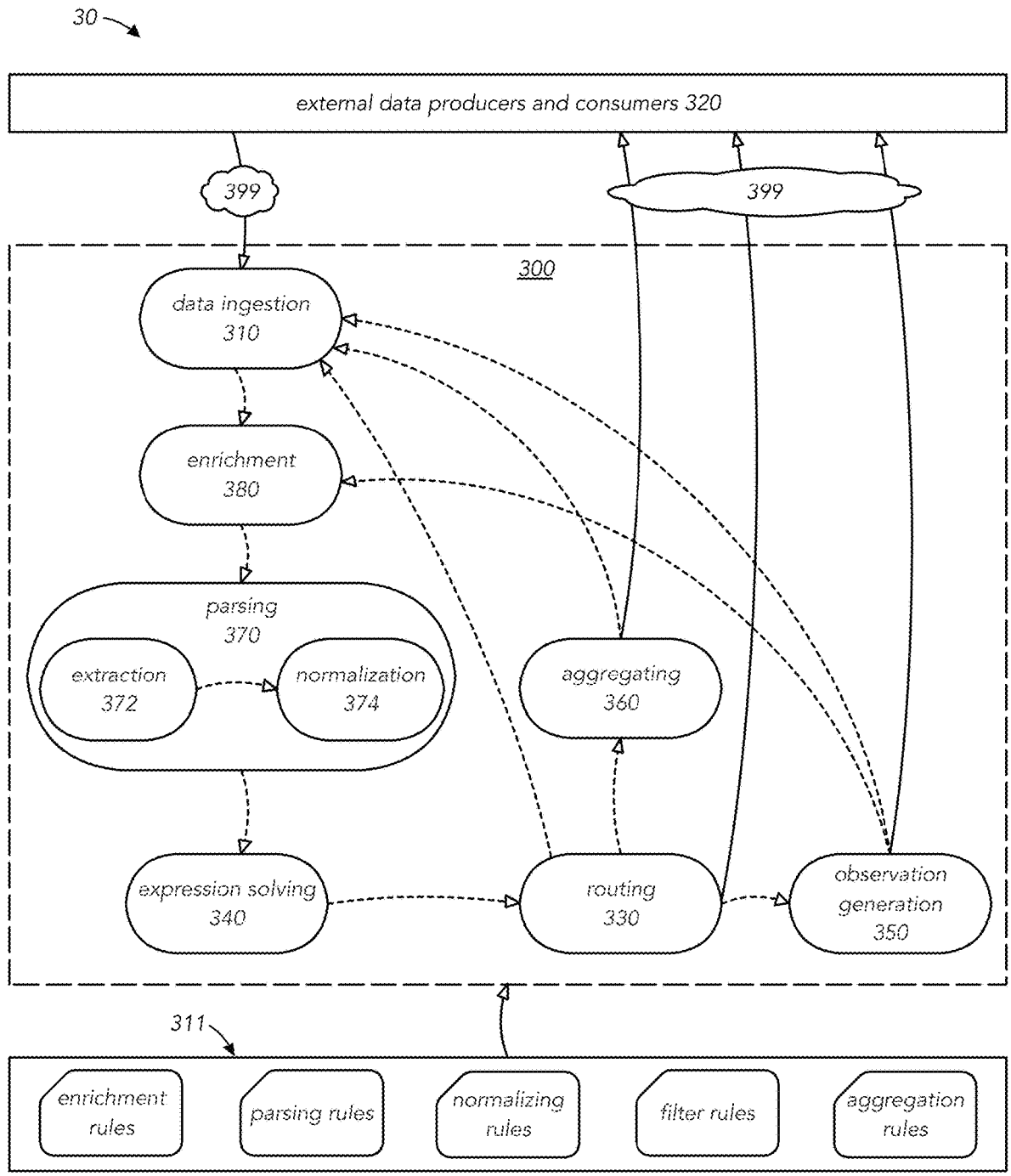
FIG. 3 illustrates a representation of the operation of the subsystems of the system and method.

FIG. 3 illustrates a non-limiting example of how the present invention may be implemented in a data center using processor-based machines such as servers, data processors, digital data storage devices, data communication networks, appliances and the like. These components may be implemented in a data center, operated over the cloud 399 as a service, and are configured and arranged in the present system in a novel way as described, including configuring various computing equipment as analytics engines, data ingestors, filter-routers, aggregators and interfaces to the same. Those skilled in the art can re-configure a given environment and data center to be set up in various configurations, not just as illustrated in these exemplary drawings. However, for the present purpose we have described for example configuring processing resources including data processors with interfaces to external systems (e.g., network or customer-facing) so as to receive incoming data streams and other digital information through a data interface to data ingestor 110, represented by the data ingestion step 310, and which can include a secure data connection interface, processor and local and/or remote storage capacity to hold machine-readable program instructions and data in memory as required (e.g., non-volatile memory).

Other subsystems or components include the filter-router 130 which receives content and definitions 180 as described herein and executes its own machine-readable program instructions to determine the appropriate routing of data, packets, or compound information. The filter-router 130 is represented by the routing step 330 on FIG. 3 and routes data and other select signals among the components of analytics engine 300. The filter-router 130 may be connected via data links such as printed circuitry, hard wired, or otherwise to exchange data signals with at least the correlation trigger subsystem 150 of analytics engine 300, the real-time aggregator subsystem 140 of analytics engine 300, the lightweight analyzer subsystem 160 of analytics engine 300, or external systems such as an incident response and investigation system (IRIS) 170. The filter-router 130 subsystem can generate or prepare or assist in generating observations 175 and/or incidents 131 which can be sent to the afore-mentioned IRIS 170, a customer 120 or fed back into the present system through the data ingestor subsystem 110.

The correlation trigger (or trigger) subsystem 150 is represented in FIG. 3 by the observation generation step 350, and includes a set of processing circuitry in an exemplary embodiment including circuitry configured and arranged to receive input signals and data from other components such as the filter-router 130 and to generate observations 175 which may be delivered to an environment, other subsystem, analytic or fed back to the ingestor subsystem 110.

Aggregations are possible by accumulating a plurality of logically relevant events or data over time (for example, a set number of login attempts from a given computer) and are represented by the aggregating step 360 of FIG. 3. Aggregations, like other data processed and generated herein can be sent to various subsystems in the system and method of the invention and may also be fed back upstream into the ingestion process 310 and ingestor 110.

The present system and method also comprehend data enrichment 380, which may be carried out in stand-alone processing units or in processing subsystems already described in the analytics engine 300. Enrichments can augment or modify data on its way to a parser subsystem or module of analytics engine 300. The parser or parsing 370 may in some examples comprise extraction 372 and/or normalization 374. The extraction 372 extracts tokens from the processed data. Normalization 374 normalizes said data (including extracted tokens) so as to change the form of some or all processed data from a first initial form to a second form having a uniformity or other consistency. As mentioned before, the specific steps and arrangement of components of the invention can be modified and varied by those skilled in the art to encompass many embodiments depending on the nature of a given application at hand. Such other configurations are encompassed within the scope of this invention.

Expression solving 340 and related steps are made possible within the analytics engine 300 and its connected subsystems.

As represented in FIG. 3, the analytics engine 300 and its main subsystems rely on or employ content 311, discussed elsewhere herein. The content 311 can include rules corresponding to program steps or scripts, including programming language instructions or SQL scripts and statements. These may be created, updated or modified by human operators or staff of a customer or service provider. Rules relating to each main function of the analytics engine 300 are possible, including for example: enrichment rules directed mainly to the enrichment subsystem or module 380; parsing rules directed mainly to the parser or parsing subsystem 370; normalizing rules directed mainly to a normalizer or normalizing subsystem 374; filter and/or routing rules directed mainly to the filter-router or routing subsystem 330; and aggregation rules directed to the aggregator or aggregating subsystem 360. Those skilled in the art can appreciate that other sets of rules and content are deliverable to the analytics engine 300 to control or assist and inform its operation.

Figure 4:
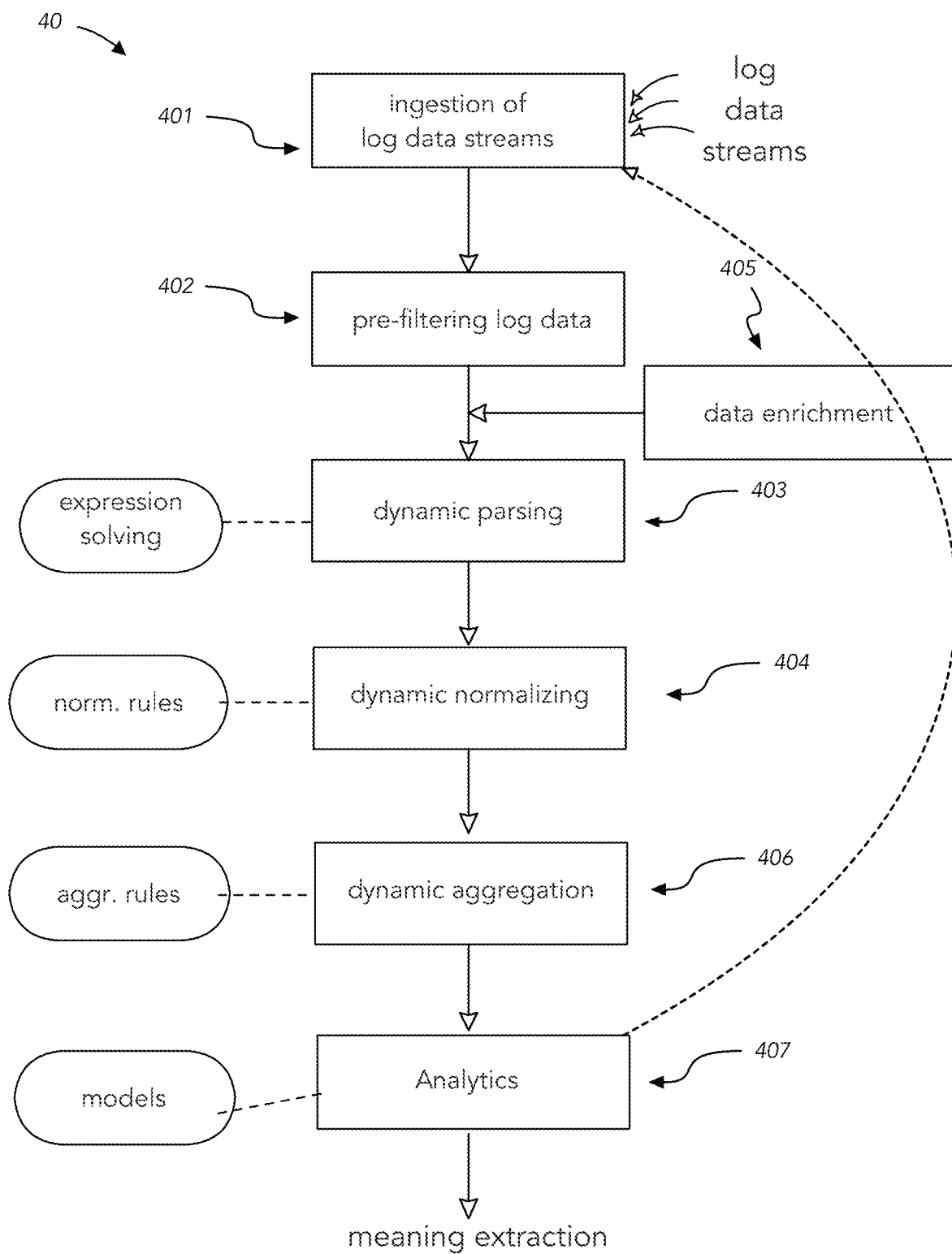
FIG. 4 illustrates an exemplary sequence of steps of a method according to one or more embodiments.

FIG. 4 illustrates an exemplary process or method 40 for dynamically processing log data and other data inputs from one or more sources. The acts or steps described may be performed in a different order than shown in the present example in some embodiments unless stated otherwise. The steps or acts given in the present examples are not always or all required for each embodiment, but rather, illustrate one or more preferred embodiments. Some steps or acts may be substituted by those skilled in the art with equivalent or other steps and acts so as to achieve a particular outcome as suits a given application, but these are intended to be within the scope of the disclosed invention and claims as well without limitation. Also, additional steps or acts in addition to the particulars discussed herein can be added where suitable in a given implementation without loss of generality, and some of the described acts or steps comprise sub-steps that may be carried out separately or aggregated into one step as understood by those skilled in the art. The present aggregation may change the dimensionality of the data from a first or original dimension to a second or aggregated dimension. The present aggregation may also re-orient data, e.g., converting it from users-by-country to country-by-user, or any other manipulation conceived of along in this context by those skilled in the art.

In the illustrated non-limiting example, streams of log data are ingested or received or taken in by the present system and method at 401. The streams of incoming log data may arrive from respective sources such as servers, clients, data stores, network devices or other machines and environments that generate information encoded as data for logging events or conditions at said respective sources. In some arrangements, a plurality of network-connected communication enabled computing systems each generate a respective stream of log data and send all or a selected portion or type of said log data to the present system and method 40. The log data and streams described can arrive as sequential or packetized or batch files, data bits or analog or digitally encoded information, depending on the nature of a given implementation, and may be delivered to the present system and method 40 over one or more communication network pathways, including wireless or wired network paths, and may be wholly or partly carried over a wide area network connecting remote systems. In one implementation, the data streams are carried over the Internet using standardized communication protocols such as TCP/IP or other standard communication methods as appreciated by those skilled in the art. The data streams may be compressed, encrypted or otherwise processed for best efficiency, security or other purposes, which is understood and comprehended in the performance of the present steps or acts without the need to illustrate the same in detail as they can be applied by those skilled in the art as well.

We refer to the log data streams in this disclosure as such but it should be understood that operations are carried out on given (some or all) log data streams during the present method so that there may be transformations made to the contents of the streams or their forms during the process and if a stream is handled by some operator, block, module, engine or hardware and/or software component of the system, a corresponding output stream may result from a respective input stream. Therefore, there should be no confusion to one of skill in the art in referencing a data stream, which may undergo some modification or transformation during its processing in the various stages of the system and method.

Upon ingestion of the incoming log data streams at the present system and method 40, each incoming log data stream is pre-filtered at pre-filtering stage 402 using a pre-filter or filtering means of the system and method including by executing machine readable instructions in processing circuitry on a server computer carrying out the present method and whereby the pre-filtering acts physically or logically upon the incoming log data streams to transform each respective log data stream from an original unfiltered form to a corresponding pre-filtered data log stream. Examples of pre-filtering include removal of redundant or non-useful (uninteresting) content and data from the incoming data streams. Where the concepts of filtering and pre-filtering are used, we may sometimes use the terms interchangeably but implying a temporal order, or in other instances pre-filtering can specify a priori eliminating data that does not match any rule. In some aspects, pre-filtering can serve to pre-identify sources of log data with respect to a firewall and to extract selected log data for routing to one or more destinations within said data center. For example, if the source of data is inside a secure firewall then it may not be required to apply the same cautious processing steps described below as to this internal trusted data.

Expression solving is carried out at parsing stage 403 which uniquely and dynamically parses the data content of the streams provided to parsing stage 403. Preferably, a plurality of rules or expressions are solved simultaneously (e.g., 1 . . . N). These expressions may comprise Boolean expressions in one or more examples. Therefore, in the dynamic parsing stage 403, the solving of expressions is also dynamic, and the properties handled in the expression solving are dynamic because the data itself is dynamic. In some examples an expression is dynamic because the properties comprising the expression are dynamic. For example, if $A*B=C$ and B is dynamic then A is dynamic as is the expression in general.

Data enrichment may be carried out at 405, for example by including, adding or enhancing a data stream with information or content that relates to the data in the data stream. The enrichment can enhance the content of a data stream with corresponding location, department or organizational aspects of the data. For example, if data is arriving from a certain location, the data may be enriched with the current weather or stock market value or other corresponding associated information about that country or location.

In an aspect, dynamic parsing may comprise one or more steps of pre-identification of specific facts, data or events; extraction of the same from a data stream; as well as matching features of the data with corresponding pre-programmed features.

Normalizing the contents of a stream is carried out at normalization stage 404. Normalization rules are employed to normalize the data in the streams. This stage can remove dependence of the data content on syntax, language, format or other factors that can be normalized out to give a baseline to the corresponding data content.

By operating on the streams described above in a dynamic manner, the present system and method 40 are able to advantageously and effectively change meanings within said data streams in real time as the data streams pass through the stages of the present method or process 40. Depending on the form in which data are received, they may have different meaning in this context. For example, if a message has a Source and a Destination address, these can be provided in different order. The dynamic and real time nature of the processing stages in this system and method offer substantial performance advantages over prior systems and methods that are limited to static parsing and processing of the data streams. Dynamic extraction of meaning from the data streams is made possible and in some embodiments users or customers of the system and method are not required to manually perform this action. The rules are dynamic in this case and can be changed by a human or a machine to extract or obtain a meaning. One advantageous result is that the present system and method more effectively and efficiently detect events and patterns of interest within large data streams, and as such can act to prevent harm or failure, or to alert an operator or customer to unwanted events or patterns.

Anomalies and conditions of interest (e.g., harmful conditions) are detected and action can be initiated based thereon. As an example, a sequence of unsuccessful login attempts on a computing platform or machine followed by a successful login could be an indication of a brute force (hacking) incident by an unauthorized party. This set of actions may be of additional interest if for example they take place in the context of a certain geographical or network location such as from a location known for perpetrating electronic espionage, a hostile nation, or a black-listed network address. If the parsing expressions and normalization rules are set up to identify such events and patterns as anomalous then this can trigger an action as an anomaly detection event. On the other hand, the present system 10 and method 40 can be configured to perform baselining where a set of actions by a party is understood to be normal and not anomalous for this party (e.g., if this party often mistypes their password and need to re-try logging in again, or routinely logs in from a certain address or location). Anomaly detection and event triggering can be dynamically formalized associations between parts of a data field with respective defined properties. In an example, the system and method can monitor or log which network IP addresses a user visits in a prior time interval, e.g., a rolling time window. Or, which IP addresses are not visited over the last time interval. An event involving IP addresses within or not within such address ranges or lists of IP addresses can thus indicate an anomalous occurrence or event.

Aggregation of the data streams, using one or more real-time aggregation rules, can take place at aggregation stage 406. The aggregation is again uniquely and advantageously performed in a dynamic way according to this system 10 and method 40. Some non-limiting aggregation procedures implemented into embodiments of the system and method may include windowing, sliding window or other processes.

During the present process, the system and method may apply further filters, which can for example be recursive or nested (in multiple layers) to provide a desired chaining of data filtering and associated steps.

Real-time dynamic analytics are applied to any or all components of the data streams as 407. For example, some light analytics may be applied by a user of the present system and method, while other more substantive analytics may be implemented at a dedicated data center described herein. Some enhancement of the data streams and additional filtering can take place at or around the time of said analytics step 407. Real-time modeling may be applied and developed in conjunction with the analytics, for example, statistical models, histogram representations of conditions or the occurrence of rules in real time are comprehended by the present real-time modeling feature. Modeling in this context may provide a baseline or historical base for analysis of prior behavior in the system and data streams. Modeling can be used to build a profile associating events of interest with an actor (human or machine). The model can be specific to an actor.

It is shown thus that the present system and method are not only capable of analyzing and responding to incoming data streams or static rules. But, the invention is a dynamic system and method that operates substantially continuously on a variety of inputs and log data streams, including on inputs that originate from components of the invention itself and are fed back into the ingestion stage of the invention, combined with, enriched by, normalized and aggregated with other data and information and conclusions so as to form a very rich, real-time and evolving threat detection system and method.

The system 10 and method 40 can thus extract meaning from the original incoming log data streams dynamically and in real time. The system and method are interactive and can apply recursive learning based on existing models and programming of the system and method so that the output of the system and method has a beneficial effect on subsequent steps described above in a loop-back fashion. Dynamic meaning can be determined on the fly or in real-time during operation of the system without excessive archiving, storing or indexing of information therein.

Figure 5:
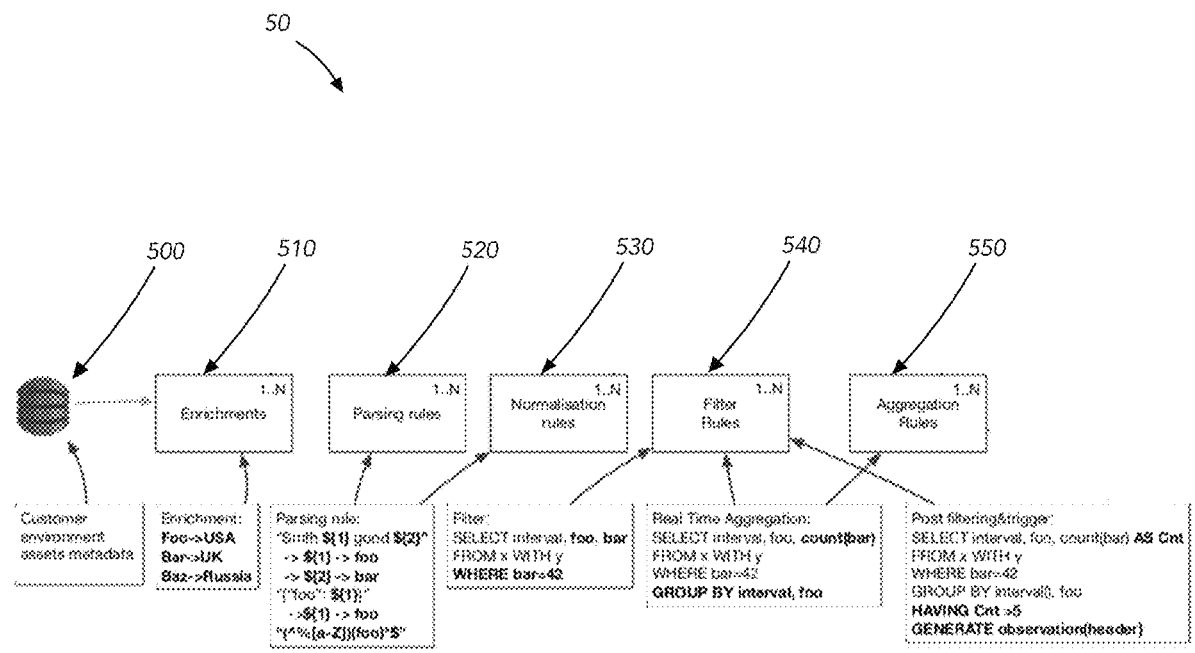
FIG. 5 illustrates exemplary content and rules generation and use.

FIG. 5 illustrates a portion 50 of the present system and method as to the use of rules content and content generation to drive the real-time operation thereof. In the context of a customer data or computing environment 500, we may apply and implement any or all of the following rules (which may consist of a plurality 1 . . . N) such as: enrichment rules used for enrichment steps by an enrichment subsystem 510; parsing rules used for parsing steps by a parsing subsystem 520; normalization rules used for normalizing steps by a normalization subsystem 530; filter or filter-routing rules used by a filter-router subsystem 540; and aggregation rules used by an aggregator subsystem 550.

As a consequence of the implementation of the present system and method, a user or entity may receive observations generated automatically by the system and method as a by-product of the stated analytics and other steps. For example, observation generation can include generation of warning signals, alarms, alert messages or similar trigger events to assist human or machine parties in avoiding unwanted consequences to their data or computing infrastructure on account of events reflected in the present log data streams. Thresholds or setpoints can be programmed manually or automatically to generate key observations.

The reader of this disclosure notes reference to content and content type in some embodiments. In the present context, content 311 can comprise data, information and resulting constructs operating on the same that are used by one or more parts of the system and method of the invention as described. Content 311 can be of certain and varied type and can have relationships between the various content.

Content 311 herein can be of a data defining content type or a data producing content type. The data defining content may comprise a taxonomy type content, which defines a set of token types that assign meaning to data values within a particular knowledge domain. The token definitions can in turn be used as a key to establish a common meaning between independently operating sub-parts of the system and method. The data defining content may also be of a data type that can comprise any data element ingested by the present ingestor including a raw data element received from a customer log data stream or a derived data element based on any processing step conducted on an ingested customer data, any of which may be defined by a data schema as best suits a given implementation.

Data producing content type may comprise enrichment, filter and projection; aggregation; trigger(s); and analytics.

Enrichment 380 comprises a transformation function that is declared as part of the processing system, which is typically applied to fields of a data type record or are the result of another transformation function for processing by the analytics engine or subsystem thereof. A filter is an expression used to qualify a subset of data records of the data type and can be an arbitrarily complex parenthetical expression using Boolean logic for example. A projection comprises a selection of fields of a data type (either direct, indirect or materialized) to be extracted for records that pass the filter expression. Both filters and projections are expressions that may utilize enrichment when expressing the data elements upon which they elaborate.

Aggregation 360 (which can be a noun in its present use, as in "an aggregation") may comprise a request for the system and method to perform and store the results of a set of aggregation operators over data selected by a filter expression and generated by a projection. Aggregations are typically keyed (grouped) by a sequence of one or more data elements of the projection expression, and gathered into a specified time interval (e.g., ten minutes, one hour, one day, and so on).

A trigger comprises a Boolean expression over the data elements of an aggregation, over a specified time interval, which when true will produce an observation(s). Triggers are intended to provide a simple declarative ability to generate observations without the need for a full or custom analytics subsystem as mentioned before.

An analytic (used in some contexts as a noun herein) comprises both definition and code, or signals encoding the same, and may include both of the specification of a filter and projection as well as a deployment of an independent component into the system to process the selected data. Analytics are intended to provide fully programmatic environments in which to accumulate data and generate observations according to some aspects of the invention.

Observations, discussed above, are themselves a data type that is ingested and processed by the present system and method. Observation reference token types are defined by the taxonomy in order to report normalized data values extracted from their analysis. An observation definition specifies the required and optional sets of tokens to be included in observation instances.

We have thus disclosed a method carried out in a cloud-based data center, the method being for dynamic processing of computer log data using an analytics engine system, the method as a service comprising in an ingestor sub-system, receiving one or more streams of log data from one or more sources of log data; in a filter-router sub-system, pre-filtering said streams, identifying sources of received data, and extracting selected data for routing to one or more destinations within said analytics engine; dynamically parsing, in real-time, some or all of said log data in said analytics engine, according to a plurality of programmed parsing rules, and based on said parsing, identifying respective characteristics of portions of said log data; dynamically extracting meaningful information tokens from parsed data, in real-time during said parsing, to generate action outputs based on said extracted meaningful tokens; normalizing data in said streams so as to remove syntactical variants therefrom and generate normalized data; enriching the normalized data so as to generating enriched data by populating additional meaningful data properties onto said normalized data; in an aggregator sub-system to aggregate a plurality of said enriched data, in real-time using a plurality of programmed aggregation rules; generating a plurality of observations, in real-time, using a plurality of programmed triggers; and sending said observations back to said ingestor so as to identify an incident representing a security threat to the sources of log data.

The present disclosure refers to systems and to methods, which are both substantive to the invention and the invention provides unique and useful improvements embodied in both such computing systems and architectures as well as in the processes and methods described. For the sake of reference, we may describe a computing machine, processor or circuit as a hardware unit which is configured and arranged, including with micro-circuit logic components, memory storage components, communication circuits and other ancillary hardware as necessary to store, execute and manage the machine-readable instructions employed by the invention. Sometimes, the hardware involved in implementing the invention as described can include general purpose or special purpose processor units that can be selected by those skilled in the art to carry out individual functions or steps of the invention, or may carry out a plurality or all of the functions of the invention, as best suits a given implementation. For example, the invention's communication functions, data storage and management, filtering and other processing functions may be carried out using specially programmed instructions encoded into digital storage units on board or coupled to a processor circuit.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods. The system and method can be implemented in one or more servers, client machines, portable computing devices, comprising hardware and software programs, scripts, application programs, applets and so on.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays (FPGA) or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the present disclosure and claims include new and novel improvements to existing methods and technologies, which were not previously known nor implemented to achieve the useful results described above. Users of the present method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. In a cloud-based data center, a method for dynamic processing of computer log data using an analytics engine system, the method as a service comprising:
in an ingestor sub-system, receiving one or more streams of log data from one or more sources of log data;
in a filter-router sub-system, pre-filtering said streams, identifying sources of received data, and extracting selected data and routing the selected data to one or more destinations within said analytics engine, the selected data being a subset of the log data that is smaller than the log data;
dynamically parsing, in real-time, some or all of said selected data in said analytics engine, according to a plurality of programmed parsing rules to generate parsed data, and based on said parsing, identifying respective characteristics of portions of said selected data;
dynamically extracting meaningful information tokens from the parsed data, in real-time during said parsing, to generate action outputs based on said extracted meaningful tokens;
normalizing data in said streams so as to remove syntactical variants therefrom and generate normalized data;
enriching the normalized data so as to generating enriched data by populating additional meaningful data properties onto said normalized data;
using an aggregator sub-system to aggregate a plurality of said enriched data, in real-time using a plurality of programmed aggregation rules;
generating a plurality of observations, in real-time, using a plurality of programmed triggers;
identifying an incident representing a security threat to the sources of log data based on the plurality of observations; and
triggering an action in response to the incident.

2. The method of claim 1, wherein said enriching step comprises generation of a plurality of enrichment rules.

3. The method of claim 1, wherein said parsing step comprises generation of a plurality of parsing rules.

4. The method of claim 1, wherein said normalizing step comprises generation of a plurality of normalizing rules.

5. The method of claim 1, wherein said routing step comprises generation of a plurality of routing rules.

6. The method of claim 1, wherein said aggregating step comprises generation of a plurality of aggregation rules.

7. A cloud-based data center system capable of identifying and responding to threats to a computing environment, the system comprising:
an analytics engine comprising a plurality of subsystems corresponding to respective processor-based circuits or circuit portions and respective corresponding machine-readable program instructions residing in non-volatile memory within or coupled to said analytics engine;
at least one data input channel carrying digitized information or data streams from a plurality of data sources including external data sources from outside the system and internal data sources from within the analytics engine;
a data ingestor subsystem of said analytics engine, coupled to said at least one data input channels, receiving input data therefrom, and corresponding to an ingestor portion of said circuitry and respective machine-readable program instructions, the ingestor subsystem configured and arranged to organize and direct ingested data from the one or more data input channels to other subsystems within said analytics engine;
a router subsystem of said analytics engine, coupled to an output of said ingestor, and corresponding to at least a router portion of said circuitry and respective machine-readable program instructions, the router subsystem configured and arranged to organize and direct routed data to other subsystems of the analytics engine, based on defined content comprising routing rules, coupled to and received by said analytics engine;
a real-time aggregator subsystem of said analytics engine, coupled to and receiving at least some of said routed data, and corresponding to at least an aggregator portion of said circuitry and respective machine-readable program instructions, the aggregator subsystem configured and arranged to aggregate or accumulate a plurality of events encoded in said routed data and to output aggregate data to at least some other subsystems of the analytics engine including said ingestor subsystem;
a correlation trigger subsystem of said analytics engine, coupled to and receiving at least said routed data from the router subsystem, the correlation trigger subsystem configured and arranged to identify and generate observations based at least on said routed data received by the correlation trigger subsystem and based on defined content comprising trigger rules; and
at least one real-time feedback data path within said analytics engine, connecting an output of at least one of said aggregator, router or trigger subsystems to an input of said ingestor subsystem so as to form a recursive loop.

* * * * *